(12) United States Patent
Goldenberg et al.

(10) Patent No.: US 10,498,961 B2
(45) Date of Patent: *Dec. 3, 2019

(54) AUTO FOCUS AND OPTICAL IMAGE STABILIZATION WITH ROLL COMPENSATION IN A COMPACT FOLDED CAMERA

(71) Applicant: Corephotonics Ltd., Tel-Aviv (IL)

(72) Inventors: Ephraim Goldenberg, Ashdod (IL); Gil Bachar, Tel-Aviv (IL); Itay Jerby, Netanya (IL); Gal Shabtay, Tel-Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,047

(22) Filed: Mar. 21, 2019

(65) Prior Publication Data

US 2019/0222758 A1    Jul. 18, 2019

Related U.S. Application Data

(63) Continuation of application No. 16/055,175, filed on Aug. 6, 2018, now Pat. No. 10,284,780, which is a continuation of application No. 15/505,120, filed as application No. PCT/IB2016/055308 on Sep. 5, 2016, now Pat. No. 10,070,060.

(Continued)

(51) Int. Cl.
*H04N 5/232*        (2006.01)
*G02B 27/64*       (2006.01)
(Continued)

(52) U.S. Cl.
CPC ......... *H04N 5/23248* (2013.01); *G02B 27/64* (2013.01); *G02B 27/646* (2013.01);
(Continued)

(58) Field of Classification Search
CPC ...... H04N 5/23248; G03B 3/10; G03B 13/36; G03B 17/17; G03B 27/64;
(Continued)

(56) References Cited

U.S. PATENT DOCUMENTS 4,199,785 A    4/1980   McCullough et al.
5,005,083 A    4/1991   Grage et al.
(Continued)

FOREIGN PATENT DOCUMENTS

CN    101276415 A    10/2008
CN    102739949 A    10/2012
(Continued)

OTHER PUBLICATIONS

Statistical Modeling and Performance Characterization of a Real-Time Dual Camera Surveillance System, Greienhagen et al., Publisher: IEEE, 2000, 8 pages.

(Continued)

*Primary Examiner* — Lin Ye
*Assistant Examiner* — Chriss S Yoder, III
(74) *Attorney, Agent, or Firm* — Nathan & Associates; Menachem Nathan

(57) ABSTRACT

Folded digital camera module comprising an optical path folding element (OPFE) for folding light from a first optical path with a first optical axis to a second optical path with a second optical axis perpendicular to the first optical axis, an image sensor, and a lens module carrying a lens with a symmetry axis parallel to the second optical axis. The camera module is adapted to perform optical image stabilization (OIS) involving at least one tilt motion of the OPFE tilt around an axis such that the OPFE tilt creates an image Roll movement and a shift movement, the OPFE tilt-created image Roll movement compensating for a folded camera module-induced Roll movement and the shift movement cancelable by a movement of the lens module.

14 Claims, 5 Drawing Sheets

Related U.S. Application Data

(60) Provisional application No. 62/215,007, filed on Sep. 6, 2015.

(51) Int. Cl.
| | | |
|---|---|---|
| *G03B 3/10* | (2006.01) | |
| *G03B 5/00* | (2006.01) | |
| *G03B 17/17* | (2006.01) | |
| *G03B 13/36* | (2006.01) | |

(52) U.S. Cl.
CPC .............. *G03B 3/10* (2013.01); *G03B 5/00* (2013.01); *G03B 13/36* (2013.01); *G03B 17/17* (2013.01); *G03B 2205/0007* (2013.01); *G03B 2205/0023* (2013.01)

(58) Field of Classification Search
CPC ........... G03B 2205/00–0092; G02B 7/64–646; G02B 27/64–646
See application file for complete search history.

(56) References Cited

U.S. PATENT DOCUMENTS

| | | | |
|---|---|---|---|
| 5,032,917 | A | 7/1991 | Aschwanden |
| 5,051,830 | A | 9/1991 | von Hoessle |
| 5,248,971 | A | 9/1993 | Mandl |
| 5,287,093 | A | 2/1994 | Amano et al. |
| 5,394,520 | A | 2/1995 | Hall |
| 5,436,660 | A | 7/1995 | Sakamoto |
| 5,444,478 | A | 8/1995 | Lelong et al. |
| 5,459,520 | A | 10/1995 | Sasaki |
| 5,657,402 | A | 8/1997 | Bender et al. |
| 5,682,198 | A | 10/1997 | Katayama et al. |
| 5,768,443 | A | 6/1998 | Michael et al. |
| 5,926,190 | A | 7/1999 | Turkowski et al. |
| 5,940,641 | A | 8/1999 | McIntyre et al. |
| 5,982,951 | A | 11/1999 | Katayama et al. |
| 6,101,334 | A | 8/2000 | Fantone |
| 6,128,416 | A | 10/2000 | Oura |
| 6,148,120 | A | 11/2000 | Sussman |
| 6,208,765 | B1 | 3/2001 | Bergen |
| 6,268,611 | B1 | 7/2001 | Pettersson et al. |
| 6,549,215 | B2 | 4/2003 | Jouppi |
| 6,611,289 | B1 | 8/2003 | Yu et al. |
| 6,643,416 | B1 | 11/2003 | Daniels et al. |
| 6,650,368 | B1 | 11/2003 | Doron |
| 6,680,748 | B1 | 1/2004 | Monti |
| 6,714,665 | B1 | 3/2004 | Hanna et al. |
| 6,724,421 | B1 | 4/2004 | Glatt |
| 6,738,073 | B2 | 5/2004 | Park et al. |
| 6,741,250 | B1 | 5/2004 | Furlan et al. |
| 6,750,903 | B1 | 6/2004 | Miyatake et al. |
| 6,778,207 | B1 | 8/2004 | Lee et al. |
| 7,002,583 | B2 | 2/2006 | Rabb, III |
| 7,015,954 | B1 | 3/2006 | Foote et al. |
| 7,038,716 | B2 | 5/2006 | Klein et al. |
| 7,199,348 | B2 | 4/2007 | Olsen et al. |
| 7,206,136 | B2 | 4/2007 | Labaziewicz et al. |
| 7,248,294 | B2 | 7/2007 | Slatter |
| 7,256,944 | B2 | 8/2007 | Labaziewicz et al. |
| 7,305,180 | B2 | 12/2007 | Labaziewicz et al. |
| 7,339,621 | B2 | 3/2008 | Fortier |
| 7,346,217 | B1 | 3/2008 | Gold, Jr. |
| 7,365,793 | B2 | 4/2008 | Cheatle et al. |
| 7,411,610 | B2 | 8/2008 | Doyle |
| 7,424,218 | B2 | 9/2008 | Baudisch et al. |
| 7,453,517 | B2 * | 11/2008 | Fujimoto ............. H04N 5/2253 348/374 |
| 7,509,041 | B2 | 3/2009 | Hosono |
| 7,533,819 | B2 | 5/2009 | Barkan et al. |
| 7,619,683 | B2 | 11/2009 | Davis |
| 7,738,016 | B2 | 6/2010 | Toyofuku |
| 7,773,121 | B1 | 8/2010 | Huntsberger et al. |
| 7,809,256 | B2 | 10/2010 | Kuroda et al. |
| 7,880,776 | B2 | 2/2011 | LeGall et al. |
| 7,918,398 | B2 | 4/2011 | Li et al. |
| 7,964,835 | B2 | 6/2011 | Olsen et al. |
| 7,978,239 | B2 | 7/2011 | Deever et al. |
| 8,115,825 | B2 | 2/2012 | Culbert et al. |
| 8,149,327 | B2 | 4/2012 | Lin et al. |
| 8,154,610 | B2 | 4/2012 | Jo et al. |
| 8,238,695 | B1 | 8/2012 | Davey et al. |
| 8,274,552 | B2 | 9/2012 | Dahi et al. |
| 8,390,729 | B2 | 3/2013 | Long et al. |
| 8,391,697 | B2 | 3/2013 | Cho et al. |
| 8,400,555 | B1 | 3/2013 | Georgiev et al. |
| 8,439,265 | B2 | 5/2013 | Ferren et al. |
| 8,446,484 | B2 | 5/2013 | Muukki et al. |
| 8,483,452 | B2 | 7/2013 | Ueda et al. |
| 8,514,491 | B2 | 8/2013 | Duparre |
| 8,547,389 | B2 | 10/2013 | Hoppe et al. |
| 8,553,106 | B2 | 10/2013 | Scarff |
| 8,587,691 | B2 | 11/2013 | Takane |
| 8,619,148 | B1 | 12/2013 | Watts et al. |
| 8,803,990 | B2 | 8/2014 | Smith |
| 8,896,655 | B2 | 11/2014 | Mauchly et al. |
| 8,976,255 | B2 | 3/2015 | Matsuoto et al. |
| 9,019,387 | B2 | 4/2015 | Nakano |
| 9,025,073 | B2 | 5/2015 | Attar et al. |
| 9,025,077 | B2 | 5/2015 | Attar et al. |
| 9,041,835 | B2 | 5/2015 | Honda |
| 9,137,447 | B2 | 9/2015 | Shibuno |
| 9,185,291 | B1 | 11/2015 | Shabtay et al. |
| 9,215,377 | B2 | 12/2015 | Sokeila et al. |
| 9,215,385 | B2 | 12/2015 | Luo |
| 9,270,875 | B2 | 2/2016 | Brisedoux et al. |
| 9,286,680 | B1 | 3/2016 | Jiang et al. |
| 9,344,626 | B2 | 5/2016 | Silverstein et al. |
| 9,360,671 | B1 | 6/2016 | Zhou |
| 9,369,621 | B2 | 6/2016 | Malone et al. |
| 9,413,930 | B2 | 8/2016 | Geerds |
| 9,413,984 | B2 | 8/2016 | Attar et al. |
| 9,420,180 | B2 | 8/2016 | Jin |
| 9,438,792 | B2 | 9/2016 | Nakada et al. |
| 9,485,432 | B1 | 11/2016 | Medasani et al. |
| 9,578,257 | B2 | 2/2017 | Attar et al. |
| 9,618,748 | B2 | 4/2017 | Munger et al. |
| 9,681,057 | B2 | 6/2017 | Attar et al. |
| 9,723,220 | B2 | 8/2017 | Sugie |
| 9,736,365 | B2 | 8/2017 | Laroia |
| 9,736,391 | B2 | 8/2017 | Du et al. |
| 9,768,310 | B2 | 9/2017 | Ahn et al. |
| 9,800,798 | B2 | 10/2017 | Ravirala et al. |
| 9,851,803 | B2 | 12/2017 | Fisher et al. |
| 9,894,287 | B2 | 2/2018 | Qian et al. |
| 9,900,522 | B2 | 2/2018 | Lu |
| 9,927,600 | B2 | 3/2018 | Goldenberg et al. |
| 10,070,060 | B2 * | 9/2018 | Goldenberg ............. G03B 3/10 |
| 10,284,780 | B2 * | 5/2019 | Goldenberg ............. G03B 3/10 |
| 2002/0005902 | A1 | 1/2002 | Yuen |
| 2002/0030163 | A1 | 3/2002 | Zhang |
| 2002/0063711 | A1 | 5/2002 | Park et al. |
| 2002/0075258 | A1 | 6/2002 | Park et al. |
| 2002/0122113 | A1 | 9/2002 | Foote |
| 2002/0167741 | A1 | 11/2002 | Koiwai et al. |
| 2003/0030729 | A1 | 2/2003 | Prentice et al. |
| 2003/0093805 | A1 | 5/2003 | Gin |
| 2003/0160886 | A1 | 8/2003 | Misawa et al. |
| 2003/0202113 | A1 | 10/2003 | Yoshikawa |
| 2004/0008773 | A1 | 1/2004 | Itokawa |
| 2004/0012683 | A1 | 1/2004 | Yamasaki et al. |
| 2004/0017386 | A1 | 1/2004 | Liu et al. |
| 2004/0027367 | A1 | 2/2004 | Pilu |
| 2004/0061788 | A1 | 4/2004 | Bateman |
| 2004/0240052 | A1 | 12/2004 | Minefuji et al. |
| 2005/0013509 | A1 | 1/2005 | Samadani |
| 2005/0046740 | A1 | 3/2005 | Davis |
| 2005/0157184 | A1 | 7/2005 | Nakanishi et al. |
| 2005/0168834 | A1 | 8/2005 | Matsumoto et al. |
| 2005/0200718 | A1 | 9/2005 | Lee |
| 2006/0054782 | A1 | 3/2006 | Olsen et al. |
| 2006/0056056 | A1 | 3/2006 | Ahiska et al. |
| 2006/0125937 | A1 | 6/2006 | LeGall et al. |

(56) References Cited

U.S. PATENT DOCUMENTS

| | | |
|---|---|---|
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0117316 A1 | 5/2008 | Orimoto |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0238327 A1 | 9/2010 | Griffith et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0181740 A1* | 7/2011 | Watanabe ............ G03B 3/10 348/208.2 |
| 2011/0229054 A1 | 9/2011 | Weston et al. |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2012/0026366 A1 | 2/2012 | Golan et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0093842 A1 | 4/2013 | Yahata |
| 2013/0135445 A1 | 5/2013 | Dahi et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0092066 A1 | 4/2015 | Geiss et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0271471 A1 | 9/2015 | Hsieh et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0024329 A1 | 1/2018 | Goldenberg et al. |
| 2018/0120674 A1 | 5/2018 | Avivi et al. |
| 2018/0150973 A1 | 5/2018 | Tang et al. |
| 2018/0241922 A1 | 8/2018 | Baldwin et al. |
| 2018/0295292 A1 | 10/2018 | Lee et al. |

FOREIGN PATENT DOCUMENTS

| | | |
|---|---|---|
| CN | 103024272 A | 4/2013 |
| CN | 103841404 A | 6/2014 |
| EP | 1536633 A1 | 6/2005 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2003298920 A | 10/2003 |
| JP | 2004133054 A | 4/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2013106289 A | 5/2013 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20150118012 A | 10/2015 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7 μm Pixels in 0.11 μm CMOS, Fife et al., Stanford University, 2008, 3 pages.

Dual camera intelligent sensor for high definition 360 degrees surveillance, Scotti et al., Publisher: IET, May 9, 2000, 8 pages.

(56) References Cited

OTHER PUBLICATIONS

Dual-sensor foveated imaging system, Hua et al., Publisher: Optical Society of America, Jan. 14, 2008, 11 pages.
Defocus Video Matting, McGuire et al., Publisher: ACM SIG-GRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 9 pages.
Superimposed multi-resolution imaging, Carles et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.

* cited by examiner

KNOWN ART

AUTO FOCUS AND OPTICAL IMAGE STABILIZATION WITH ROLL COMPENSATION IN A COMPACT FOLDED CAMERA

CROSS-REFERENCE TO RELATED APPLICATIONS

This application is a Continuation application from U.S. patent application Ser. No. 16/055,175 filed Aug. 6, 2018 (now allowed), which was a Continuation application from U.S. patent application Ser. No. 15/505,120 filed Feb. 20, 2017, which was a 371 application from international patent application No. PCT/IB2016/055308 filed Sep. 5, 2016, and claims priority from U.S. Provisional Patent Application No. 62/215,007 filed on Sep. 6, 2015, which is expressly incorporated herein by reference in its entirety.

FIELD

Embodiments disclosed herein relate in general to digital cameras and in particular to thin folded-lens dual-aperture ("dual-optical module") digital cameras with zoom and/or auto-focus and/or optical image stabilization mechanism.

BACKGROUND

In recent years, mobile devices such as cell-phones (and in particular smart-phones), tablets and laptops have become ubiquitous. Most of these devices include one or two compact cameras: a main rear-facing camera (i.e. a camera on the back side of the device, facing away from the user and often used for casual photography) and a secondary front-facing camera (i.e. a camera located on the front side of the device and often used for video conferencing).

Although relatively compact in nature, the design of most of these cameras is very similar to the traditional structure of a digital still camera, i.e. they comprise an optical component (or a train of several optical elements and a main aperture) placed on top of an image sensor. The optical component (also referred to as "optics") refracts the incoming light rays and bends them to create an image of an object or scene on the sensor. The dimensions of these cameras are largely determined by the size of the sensor and by the height of the optics. These are usually tied together through the focal length ("f") of the lens and its field of view (FOV)—a lens that has to image a certain FOV on a sensor of a certain size has a specific focal length. Keeping the FOV constant, the larger the sensor dimensions (e.g. in a X-Y plane) the larger the focal length and the optics height.

As the dimensions of mobile devices (and in particular the thickness of devices such as smartphones) shrink, the compact camera dimensions become more and more a limiting factor on the mobile device thickness. Several approaches have been proposed to reduce the compact camera thickness in order to alleviate this constraint. One such approach uses a so-called "folded" camera module that includes a "folded lens". In the folded camera module structure, an optical path folding element (referred to hereinafter as "OPFE") e.g. a prism or a mirror, is added to tilt the light propagation direction from a direction perpendicular to the phone back surface to a direction parallel to the phone back surface. If the folded camera module is part of a dual-aperture camera, this provides a folded optical path through one lens module (normally a "Tele" lens module). Such a camera is referred to herein as folded-lens dual-aperture camera or dual-aperture camera with folded lens. Zoom dual-aperture and multi-aperture cameras with folded lens are disclosed for example in Applicant's US patent application No. 20160044250. A zoom dual-aperture camera with folded lens is also shown therein incorporated in a portable electronic device (e.g. a smartphone).

In addition to the optics and sensor, modern cameras usually further include mechanical motion (actuation) mechanism for two main purposes: focusing of the image on the sensor and optical image stabilization (OIS). For focusing, in more advanced cameras, the position of the lens module (or at least one lens element in the lens module) can be changed by means of an actuator and the focus distance can be changed in accordance with the captured object or scene. In these cameras it is possible to capture objects from a very short distance (e.g., 10 cm) to infinity. The trend in digital still cameras is to increase the zooming capabilities (e.g. to 5×, 10× or more) and, in cell-phone (and particularly smart-phone) cameras, to decrease the pixel size and increase the pixel count. These trends result in greater sensitivity to hand-shake or in a need for longer exposure time. An OIS mechanism is required to answer the needs in these trends. More information on auto-focus and OIS in a compact folded camera may be found in Applicant's international patent applications PCT/IB2016/052143 filed Apr. 14, 2016, PCT/IB2016/052179 filed Apr. 15, 2016 and PCT/IB2016/053335 filed Jun. 7, 2016.

In OIS-enabled cameras, the lens or camera module can change its lateral position or tilt angle in a fast manner to cancel the handshake during the image capture. Handshakes shift the camera module in 6 degrees of freedom, namely linear movements in orthogonal directions X-Y-Z, Roll (tilt around the X axis), Yaw (tilt around the Z axis) and Pitch (tilt around the Y axis). Henceforth and for simplicity, the terms "around the X axis", "around the Y axis" and "around the Z axis" are replaced with, respectively, "around X", "around Y" and "around Z". The definitions of Roll, Yaw and Pitch as used in this description are shown with reference to FIG. 1, which shows an exemplary smartphone 100 in a front perspective view and a back perspective view, the back view showing two back cameras 102 and 104. Hereinafter, the undesirable Roll motion of the camera module resulting from handshakes or other unwanted movements may also be referred to (in addition to simply "Roll") as "camera module-induced Roll movement" or "camera module-induced Roll". "Roll" also relates to the tilt around the optical axis of the camera module that provides the displayed image. Roll results in rotation of an image around the image center (and may thus be referred to as "image Roll"). The linear motion in X-Y-Z has negligible effect on the image quality, and does not have to be compensated for.

FIG. 2 shows an embodiment of a folded camera module numbered 200 with both AF and OIS mechanisms, disclosed in Applicant's international patent application PCT/IB2016/053335. Camera module 200 comprises a lens module 202 carrying a lens, an OPFE (here a mirror) 204 and an image sensor 206. The lens may have for example a 4-20 mm effective focal length (EFL), serving as a "Tele" lens, and it can be included in a dual-aperture camera together with a second camera module having for example a lens with 3-5 mm EFL ("Wide lens") and a second image sensor.

The lens module and the mirror move independently of each other, the movements shown by arrows. That is, lens module 202 may perform two movements, a movement for AF along the Z axis and a movement for OIS along the Y axis. Another movement for OIS is achieved by tilt of mirror 204' around Y. The two movements for OIS compensate for Pitch and Yaw but not for Roll.

There is a therefore a need for, and it would be advantageous to have devices, systems and methods that compensate for image Roll in addition to Pitch and Yaw, particularly in dual-aperture or multi-aperture cameras that include a folded camera module and in host devices (such as smartphones) incorporating such cameras.

SUMMARY

Embodiments disclosed herein teach folded camera modules and folded-lens dual-aperture cameras in which the OIS functionality is split between two optical elements—the (folded) lens module and the OPFE. Embodiments disclosed herein further teach host electronic devices such as smartphones that incorporate such folded camera modules and folded-lens dual aperture cameras. While the description is focused on dual-aperture cameras with one folded camera module, it is to be understood that the disclosed herein applies equally well to multi-aperture cameras (e.g. with three or more camera modules) in which at least one camera module is a folded camera module. Such multi-aperture cameras are disclosed for example in co-invented and co-owned US patent application No. 20160044250.

In the description below (see also FIGS. 3-5) the following system of X-Y-Z coordinates is chosen exemplarily and for explanation purposes only: the Z axis is parallel to an optical axis of a lens module (and lens) of a folded camera module (referred to henceforth as "second optical axis"); the Y axis is perpendicular to the optical axis of the lens and is also parallel to the surface of a tilting OPFE (e.g. a prism or mirror) when the tilting OPFE is at a zero point of actuation. The X axis is perpendicular to the optical axis of the lens and at 45 degrees of the plane of the OPFE when the OPFE is at a zero point of actuation. The X axis is also parallel to a "first optical axis" orthogonal to the second optical axis.

In exemplary embodiments there are provided folded camera modules comprising: an OPFE for folding light from a first optical path with a first optical axis to a second optical path with a second optical axis perpendicular to the first optical axis, the OPFE designed to tilt around an axis such that the OPFE tilt creates an image Roll movement and a shift movement, the OPFE tilt-created image Roll movement compensating for a folded camera module-induced Roll movement; and a lens module carrying a lens with a symmetry axis parallel to the second optical axis, the lens module designed to move such as to compensate for the OPFE tilt-created shift movement, whereby the tilt of the OPFE and the movement of the lens module provide OIS that includes image Roll compensation.

In an exemplary embodiment, the OPFE design to tilt around an axis includes a design to tilt around a first axis included in a plane formed by the first and second optical axes.

In an exemplary embodiment, the lens module design to move includes a design to move in a first direction orthogonal to both the first and second optical axes.

In an exemplary embodiment, the lens module design to move further includes a design to move in a second direction parallel to the first optical axis.

In an exemplary embodiment, the OPFE is further designed to tilt around a second tilt axis orthogonal to both the first and second optical axes.

In an exemplary embodiment, the lens module is further designed to move for auto-focus in a direction parallel to the second optical axis.

In an exemplary embodiment, the lens module is further designed to move for auto-focus in a direction parallel to the second optical axis.

In an exemplary embodiment, the lens module is further designed to move for auto-focus in a direction parallel to the second optical axis.

In exemplary embodiments there are provided dual-aperture or multi-aperture digital cameras comprising at least one folded camera module designed to perform OIS with Roll compensation as described above, as well as autofocus.

In an exemplary embodiment there is provided a method comprising: proving a folded camera module that includes an OPFE for folding light from a first optical path with a first optical axis to a second optical path with a second optical axis perpendicular to the first optical axis and a lens module carrying a lens with a symmetry axis parallel to the second optical axis; tilting the OPFE around an axis such that the OPFE tilt creates an image Roll movement and a shift movement, the OPFE tilt-created image Roll movement compensating for a folded camera module-induced Roll movement; and moving the lens module such as to compensate for the OPFE tilt-created shift movement, whereby the tilt of the OPFE and the movement of the lens module provide OIS that includes image Roll compensation.

In an exemplary embodiment, the tilting the OPFE around an axis includes tilting the OPFE around a first axis included in a plane formed by the first and second optical axes.

In an exemplary embodiment, the moving the lens module includes moving the lens module in a first direction orthogonal to both the first and second optical axes.

In an exemplary embodiment, the moving the lens module includes moving the lens module in a second direction parallel to the first optical axis.

In an exemplary embodiment, a method further comprises tilting the OPFE around a second tilt axis orthogonal to both the first and second optical axes.

In an exemplary embodiment, a method further comprises moving the lens module for auto-focus in a direction parallel to the second optical axis.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated like numerals.

DETAILED DESCRIPTION

The present inventors have determined that a tilt movement (or "rotation") of the OPFE around any axis, such tilt causing both image Roll and shift, can advantageously be used together with a folded lens module movement for full OIS including Roll, pitch and yaw compensation. The OPFE tilt-caused shift is compensated by an appropriate opposite shift movement of the lens module while the OPFE tilt-caused Roll is for OIS, compensating for the image Roll. The Roll compensation is based on the fact that rotation of the OPFE around Y causes an image shift in the X direction, while rotation of the OPFE around another axis such as X or Z causes both image shift in the Y direction and image rotation around the Z axis. For example, any tilt of the OPFE around an axis within the XZ plane will cause Roll+image shift in the Y direction. For simplicity and exemplarily, the OPFE is referred to in the following description as "prism". The movements of the lens module may be performed using actuators described in detail in Applicant's international patent application PCT/IB2016/052143 filed Apr. 14, 2016.

Figure 1:
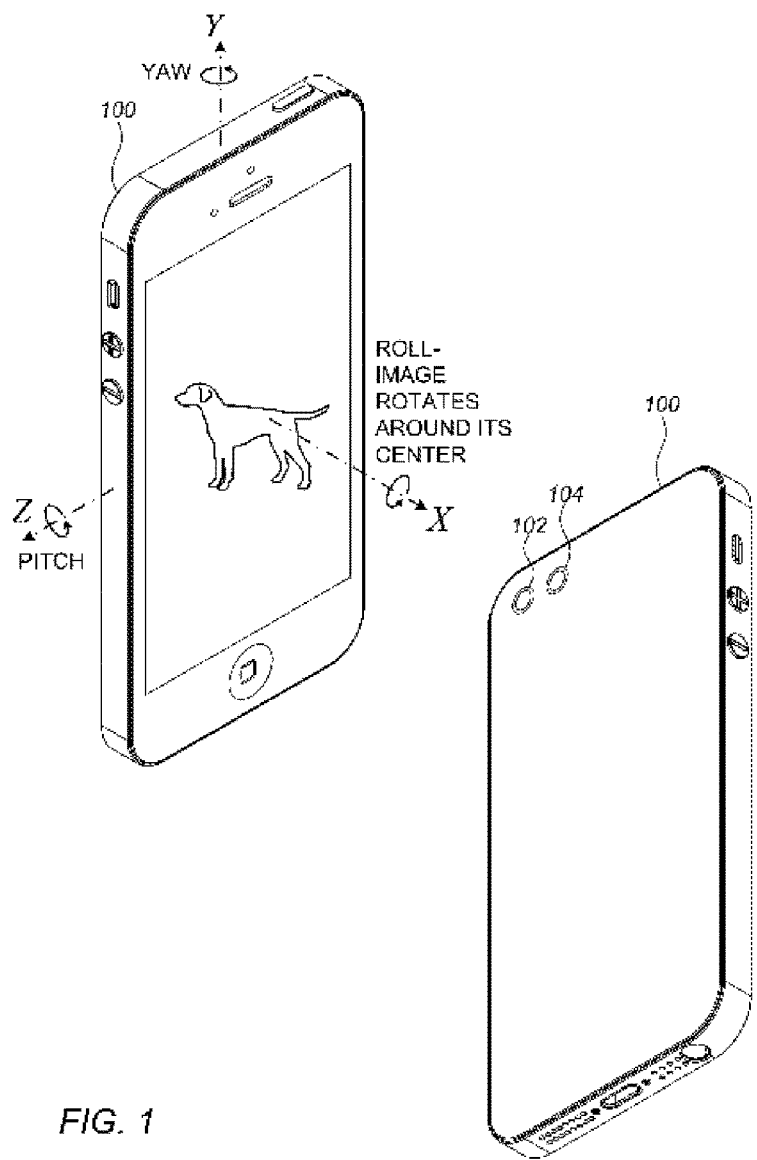
FIG. 1 shows the definitions of Roll, Pitch and Yaw movements in a smartphone having a back dual-aperture camera.
Figure 2:
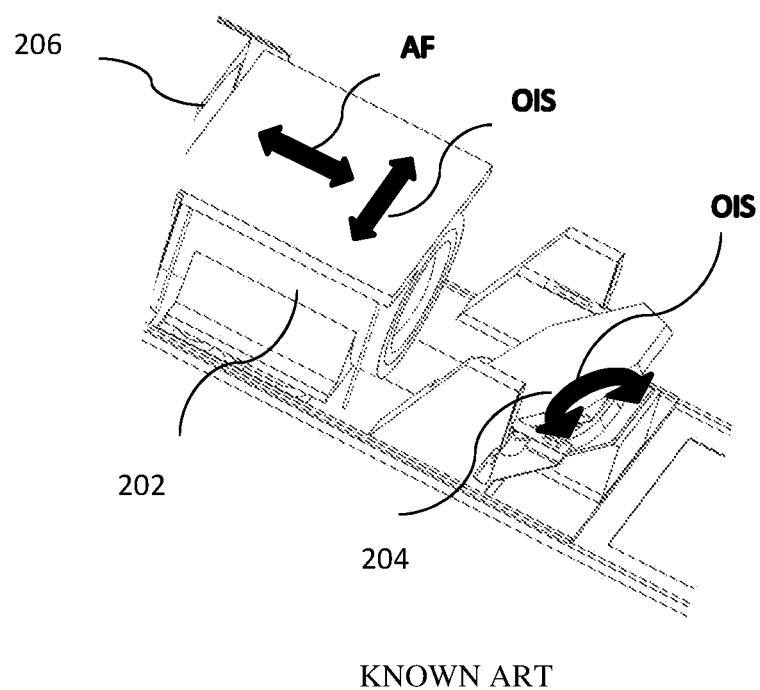
FIG. 2 shows schematically an embodiment of a known folded camera module with AF and OIS movements of the lens module and the OIS tilt movement of the OPFE around Y.
Figure 3:
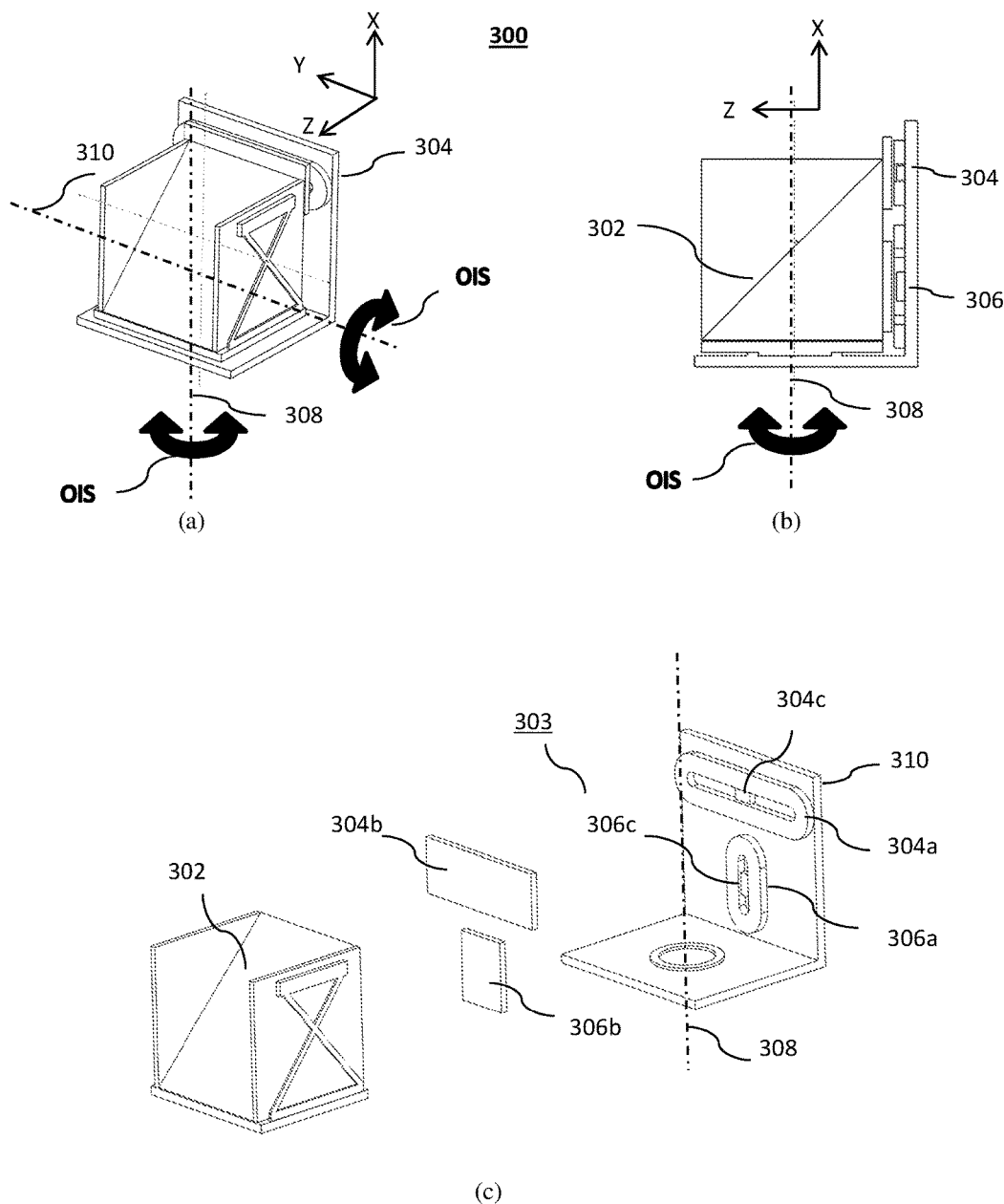
FIG. 3 shows in (a) an isometric view, in (b) a side view of an OPFE configured to perform two OIS tilt movements around X and Y and in (c) an exploded view of the OPFE actuation sub-assembly.

In an exemplary embodiment, the OPFE tilt movement is around an axis in the XZ plane. Specifically, the prism assembly 300 shown in FIGS. 3a-3c may be controllably rotated around the X axis in addition to being controllably rotated around the Y axis, the latter as in FIG. 2 and described in PCT/IB2016/052143. The rotation may be for example up to ±1 degree around the zero point of actuation. Prism assembly 300 includes a prism 302 mounted on a prism carrier 302' and a prism actuation sub-assembly 303 with two actuators 304 and 306, shown in an exploded view in FIG. 3c. Each actuator includes a coil-magnet pair. Actuator 304 includes a coil 304a and a magnet 304b while actuator 306 includes a coil 306a and a magnet 306b. The two coils are positioned (e.g. rigidly assembled/mounted/glued) on a plate 310. Magnets 304a and 304b are positioned (e.g. rigidly assembled/mounted/glued) on prism carrier 302'. When prism actuation sub-assembly 303 is assembled, magnets 304b and 306b are located next to coils 304a and 306a, respectively. The operation of electro-magnetic actuators such as actuators 304 and 306 is well known and described for example in PCT/IB2016/052143. Lorentz forces applied on the coils apply forces on the magnets along the X and Y axes and thus rotate the prism around these axes. More specifically regarding the prism rotation, actuator 304 rotates prism 302 around Y (axis 310) and actuator 306 rotates the prism around X (axis 308). The rotation movement of the prism around X causes an effect on the image identical to the tilt of the camera module around Z plus tilt of the camera module around X. A linear movement of the lens along the Y direction causes to a good approximation the same effect as the tilt of the camera module around Z. The combination of the lens movement along Y and the prism rotation around X can cause an effect identical to a combined rotation of the camera module around X and tilt around Z. The rotation of the prism around Y causes an effect identical with tilt of the camera module around Y. The motion of prism actuation sub-assembly 303 in the X and Y directions can be measured by position sensors, for example Hall-bar sensors (or just "Hall-bars") 312a and 312b which are coupled to the magnetic field created by, respectively, magnets 304a and 304b.

In summary, by combining rotation of the prism around two axes (Y and X) and by shifting the lens in the Y direction one can achieve OIS compensation for X-direction blur, Y-direction blur and tangential blur (Roll).

In an implementation example, suppose we know from analysis of information received from an inertial device such as an accelerometer or gyroscope that the image is shifted by X μm along the X direction and by Y μm along the Y direction and is also rotated by A degrees (A°) around the Z axis (Roll) We want to correct these movements by introducing shift and rotation in directions opposite to the shifts along X and Y above and to the Roll. Using prism assembly 300, the prism will be rotated around Y until the image is shifted by −X μm and around X (or Z) until the image is rotated around Z by −A°. As a consequence of the X rotation, the image will also be shifted in the Y direction. The shift magnitude or "residual transition" (RT) in microns depends on the degree of rotation, lens focal length, etc. so as to achieve the required −Y μm shift in the Y direction. For example, $RT = EFL \times Tan(A)$, where EFL is the lens effective focal length and A is the rotation angle. EFL can be 3 mm to 20 mm and A can be 0-5 degrees. The lens will be shifted by −(Y μm+RT μm) to compensate for the image shift.

In contrast, in known camera modules such as camera module 200, the OPFE will be rotated around Y until the image is shifted by −X μm and the lens is shifted by −Y μm. The Roll of magnitude A° will not be compensated.

Figure 4:
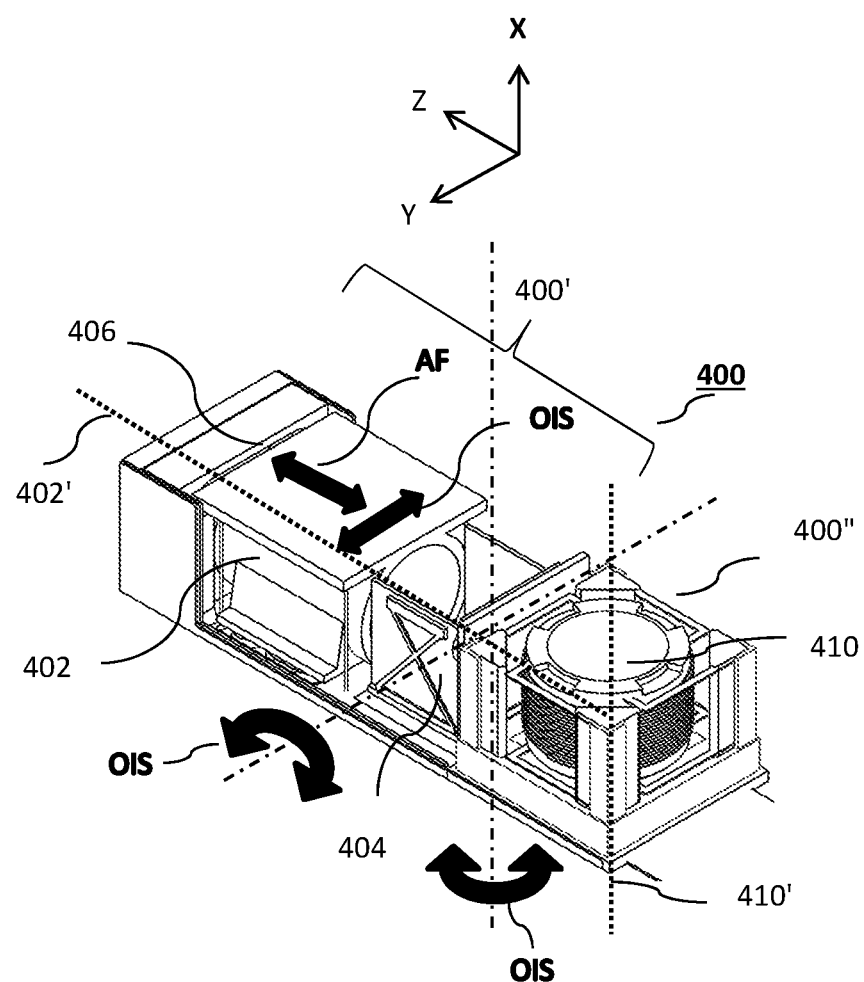
FIG. 4 shows schematically a folded camera module disclosed herein with AF and one OIS movement of the lens module and with two tilts movement of the OPFE.

FIG. 4 shows schematically an embodiment numbered 400' of a folded camera module disclosed herein. Camera module 400' is designed to perform OIS that corrects Yaw, Pitch and Roll motions. In addition, camera module 400' is also designed to perform autofocus (AF), for example as described in PCT/IB2016/052143. In camera module 400', the OIS is performed by one movement of the lens module (in the Y direction) and by two tilt movements of the OPFE (around Y and X), the latter movements as described with reference to OPFE 300 in FIG. 3(a). Exemplarily, folded camera module 400' is shown together with an upright (unfolded) camera module 400", the two camera modules forming a dual-aperture camera 400. Similar to folded camera modules 100 and 200, folded camera module 400' comprises a lens module 402 with an optical axis 402', an OPFE (here a prism) 404 and an image sensor 406. Upright camera module 400" comprises a lens module 410 with an optical axis 410', as well as an image sensor (not shown). Prism 404 is operative to fold light from an optical path 408 parallel to optical axis 410' to a an optical path parallel to optical axis 402'. Optical axis 402' is perpendicular to optical axis 410'.

Figure 5:
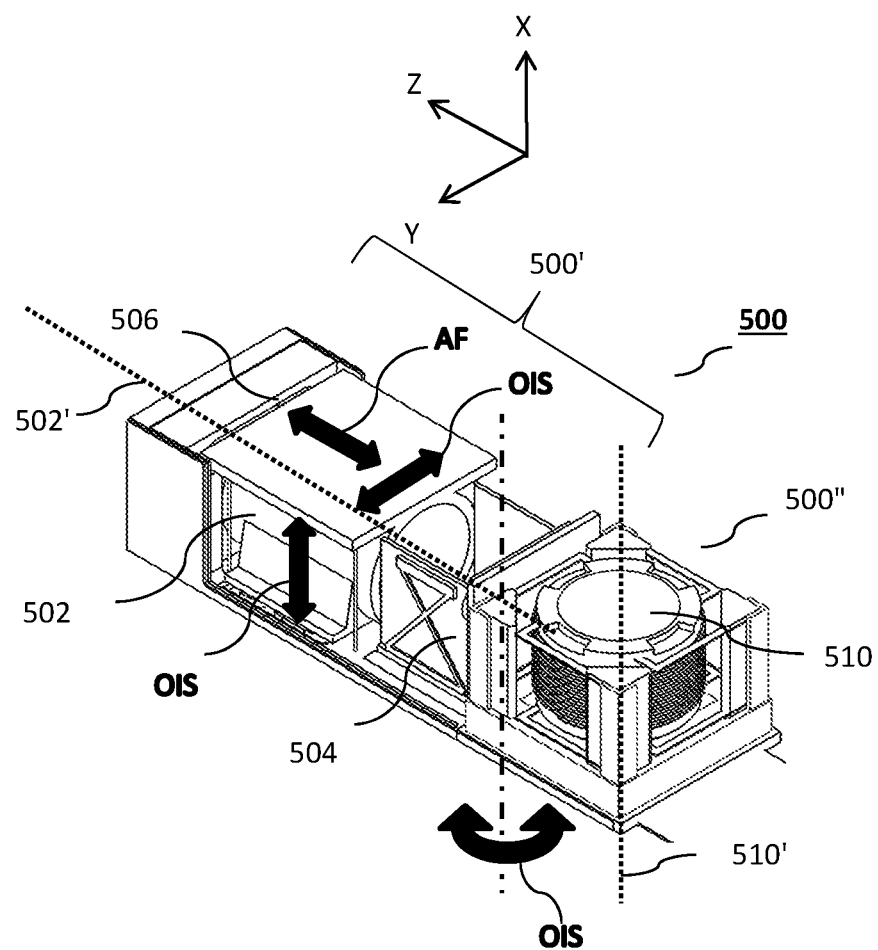
FIG. 5 shows schematically a folded camera module disclosed herein with AF and two OIS movements of the lens module and with one tilt movement of the OPFE.

FIG. 5 shows schematically an embodiment numbered 500' of a folded camera module disclosed herein. Camera module 500' is designed to perform OIS that corrects Yaw, Pitch and Roll motions. In addition, camera module 500' is also designed to perform autofocus (AF). In camera module 500', the OIS is performed by two movements of the lens module (along the X and Y directions) and by one tilt movement of the OPFE around X, the latter movement as described with reference to OPFE 300 in FIG. 3(b). Exemplarily, folded camera module 500' is shown together with an upright (unfolded) camera module 500", the two camera modules forming a dual-aperture camera 500. Similar to folded camera modules 100 and 200, folded camera module 400' comprises a lens module 502 with an optical axis 502', an OPFE (here a prism) 504 and an image sensor 506. Upright camera module 500" comprises a lens module 510 with an optical axis 510' and an image sensor (not shown). Prism 504 is operative to fold light from an optical path 508 parallel to optical axis 510' to an optical path parallel to optical axis 502'. Optical axis 502' is perpendicular to optical axis 510'.

While this disclosure has been described in terms of certain embodiments and generally associated methods, alterations and permutations of the embodiments and methods will be apparent to those skilled in the art. For example, while the incorporation of a folded camera module described herein in a dual-aperture camera is described in some detail, a folded camera module may be incorporated in a multi-aperture camera having more than two camera modules. The disclosure is to be understood as not limited by the specific embodiments described herein, but only by the scope of the appended claims.

What is claimed is:

1. A folded camera module comprising:
   a) an optical path folding element (OPFE) for folding light from a first optical path with a first optical axis to a second optical path with a second optical axis perpendicular to the first optical axis; and
   b) a lens module carrying a lens with a symmetry axis parallel to the second optical axis,
      wherein the OPFE is designed to tilt and wherein the lens module is designed to move such that the OPFE tilt and the lens module movement cooperatively provide optical image stabilization (OIS) that compensates for roll of the folded camera module in addition to compensation for pitch and yaw movements of the folded camera module.

2. The folded camera module of claim 1, wherein the OPFE design to tilt includes a design to tilt around two, first and second tilt axes that are orthogonal to each other such that tilt of the OPFE around the first axis shifts an image obtained with the folded camera module in a first direction and tilt of the OPFE around the second axis shifts the image obtained with the folded camera module in a second direction opposite to the given direction as well as rolls the image, and wherein the lens module design to move includes a design to shift the image in the second direction.

3. The folded camera module of claim 2, wherein the lens module is further designed to move for auto-focus in a direction parallel to the second optical axis.

4. The folded camera module of claim 2, incorporated in a digital camera.

5. The folded camera module of claim 1, wherein the lens module is further designed to move for auto-focus in a direction parallel to the second optical axis.

6. The folded camera module of claim 1, wherein the OPFE is selected from the group consisting of a prism, a mirror and a prism covered with a metallic reflecting surface.

7. The folded camera module of claim 1, incorporated in a portable electronic device.

8. The folded camera module of claim 1, incorporated in a digital camera.

9. A multi aperture digital camera comprising a folded camera module according to claim 1 and at least one other camera module.

10. The multi aperture camera of claim 9, incorporated in a portable electronic device.

11. A method of providing optical image stabilization in a folded camera module that includes an optical path folding element (OPFE) for folding light from a first optical path with a first optical axis to a second optical path with a second optical axis perpendicular to the first optical axis and a lens module carrying a lens with a symmetry axis parallel to the second optical axis, the method comprising:
    tilting the OPFE and moving the lens module cooperatively to provide optical image stabilization (OIS) that compensates for roll of the folded camera module in addition to compensation for pitch and yaw movements of the folded camera module.

12. The method of claim 11, wherein tilting the OPFE includes tilting the OPFE around two, first and second tilt axes that are orthogonal to each other such that tilt of the OPFE around the first axis shifts an image obtained with the folded camera module in a first direction and tilt of the OPFE around the second axis shifts the image obtained with the folded camera module in a second direction opposite to the given direction as well as rolls the image, and wherein moving the lens module includes moving the lens module such as to shift the image in the second direction.

13. The method of claim 12, further comprising moving the lens module for auto-focus in a direction parallel to the second optical axis.

14. The method of claim 11, further comprising moving the lens module for auto-focus in a direction parallel to the second optical axis.

* * * * *